United States Patent
Cao et al.

(10) Patent No.: US 12,013,098 B1
(45) Date of Patent: Jun. 18, 2024

(54) ULTRA-THIN DOWNLIGHT

(71) Applicant: Xiamen PVTECH Co., Ltd., Fujian (CN)

(72) Inventors: Liangliang Cao, Fujian (CN); Fuxing Lu, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/195,923

(22) Filed: May 10, 2023

(30) Foreign Application Priority Data

Jan. 16, 2023 (CN) .......................... 202310075234.1

(51) Int. Cl.
| | | |
|---|---|---|
| *F21S 8/02* | (2006.01) | |
| *F21V 15/01* | (2006.01) | |
| *F21V 19/00* | (2006.01) | |
| *F21V 29/70* | (2015.01) | |
| *F21Y 105/18* | (2016.01) | |

(52) U.S. Cl.
CPC .............. *F21S 8/026* (2013.01); *F21V 15/01* (2013.01); *F21V 19/003* (2013.01); *F21V 29/70* (2015.01); *F21Y 2105/18* (2016.08)

(58) Field of Classification Search
CPC ........ F21S 8/026; F21V 15/01; F21V 19/003; F21V 29/70; F21Y 2105/18
See application file for complete search history.

(56) References Cited

U.S. PATENT DOCUMENTS

| | | | |
|---|---|---|---|
| 9,568,181 B2* | 2/2017 | Boomgaarden | F21V 29/70 |
| 10,571,099 B2* | 2/2020 | Winters | F21V 21/03 |
| 10,584,858 B1* | 3/2020 | Boulanger | F21K 9/20 |
| 10,816,181 B2* | 10/2020 | De Mol | F21V 19/0055 |
| 11,015,791 B2* | 5/2021 | Hou | F21V 23/009 |
| 2010/0225215 A1* | 9/2010 | Lee | F21K 9/00 313/1 |
| 2016/0131350 A1* | 5/2016 | Li | H05K 1/115 362/382 |
| 2018/0216801 A1* | 8/2018 | Thiele | F21V 19/004 |
| 2019/0264891 A1* | 8/2019 | Wang | F21V 5/046 |
| 2020/0217491 A1* | 7/2020 | Hou | F21V 23/009 |
| 2020/0248898 A1* | 8/2020 | Chen | F21V 23/0464 |
| 2020/0350300 A1* | 11/2020 | Jang | F21V 23/0435 |
| 2020/0389954 A1* | 12/2020 | Sinphay | F21V 29/00 |

\* cited by examiner

*Primary Examiner* — Tsion Tumebo
(74) *Attorney, Agent, or Firm* — Winston Hsu

(57) ABSTRACT

An ultra-thin downlight includes a heat radiator, a light source module, a protective cover and a light cover. The inner side of the heat radiator is provided with a central hole. The light source module includes a circuit board, a plurality of light-emitting elements and a driving element. The circuit board is fixed on the assembling portion of the heat radiator, and the light-emitting elements and the driving element are disposed on the circuit board, such that each of the light-emitting elements protrudes from the central hole. The protective cover is disposed on the circuit board to cover the light-emitting elements and the driving element. The protective cover is corresponding to the central hole. The light cover is combined with the installation portion of the heat radiator to cover the protective cover.

8 Claims, 6 Drawing Sheets

ULTRA-THIN DOWNLIGHT

BACKGROUND OF THE INVENTION

1. Field of the Invention

The present invention relates to a downlight, in particular to an ultra-thin downlight.

2. Description of the Prior Art

Many housing and commercial buildings are provided with downlights. A currently available downlight is usually thick and the installation process thereof is complicated. In addition, the currently available downlight needs a driver box, which needs a complicated wiring process. Moreover, the currently available downlight is usually provided with a reflector, a lens, a protective cover, etc. Thus, the structure of the currently available downlight is also complicated.

SUMMARY OF THE INVENTION

One of the primary objects of the present invention is to provide an ultra-thin downlight so as to reduce the material cost and manufacturing cost. The downlight can be of simple structure and of low cost. The back side of the heat radiator is provided with an assembling portion and the front side of the heat radiator is provided with an installation portion and a central hole disposed in the installation portion. The light source module includes a circuit board, a plurality of light-emitting elements and a driving element. The circuit board is fixed on the assembling portion. The light-emitting elements and the driving element are disposed on the circuit board, such that each of the light-emitting elements protrudes from the central hole. The protective cover is disposed on the circuit board to cover the light-emitting elements and the driving element. The protective cover is corresponding to the central hole. The light cover is combined with the installation portion to cover the protective cover.

In one embodiment, the heat radiator is made of a metal material.

In one embodiment, the heat radiator has an inner reflecting slope disposed on the installation portion and an outer slope disposed around the inner reflecting slope. The heat radiator is dish-shaped.

In one embodiment, the protective cover is covered by a lens and the lens and the protective cover are integrally-formed. The lens is detachably disposed on the installation portion to cover the central hole.

In one embodiment, the protective cover is made of a transparent plastic material.

In one embodiment, the installation portion is a circular and cup-shaped. The inner wall of the installation portion is provided with a plurality of through holes. The edge of the light cover is provided with a plurality of hooks engaged with the through holes respectively.

In one embodiment, the protective cover is provided with a plurality of slots and the edge of the central hole penetrates through the slots to contact the circuit board.

In one embodiment, the circuit board has a plurality of combining holes. A stud, for fixing a junction box, penetrates through one of the combining holes and is fixed in the combining hole.

In one embodiment, the heat radiator has a plurality of observation holes disposed on the installation portion and one of the observation holes is corresponding to the stud, such that the stud is able to be observed via the observation hole.

In one embodiment, the circuit board has a switch module for adjusting the color temperature or the power of the light-emitting elements.

To sum up, according to the embodiments of the present invention, the structure of the heat radiator of the ultra-thin downlight is flat and circular. Via this structure, the downlight can operate normally without a reflector. In addition, the lens and protective cover of the downlight are integrally-formed, which can significantly reduce the material cost and manufacturing cost. Thus, the overall cost of the ultra-thin downlight can be greatly decreased.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
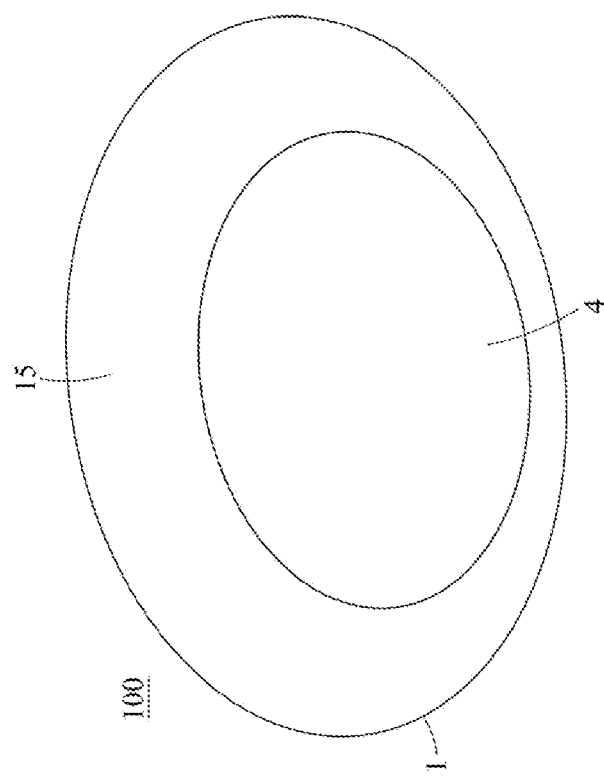
FIG. 1 is a perspective view of an ultra-thin downlight in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
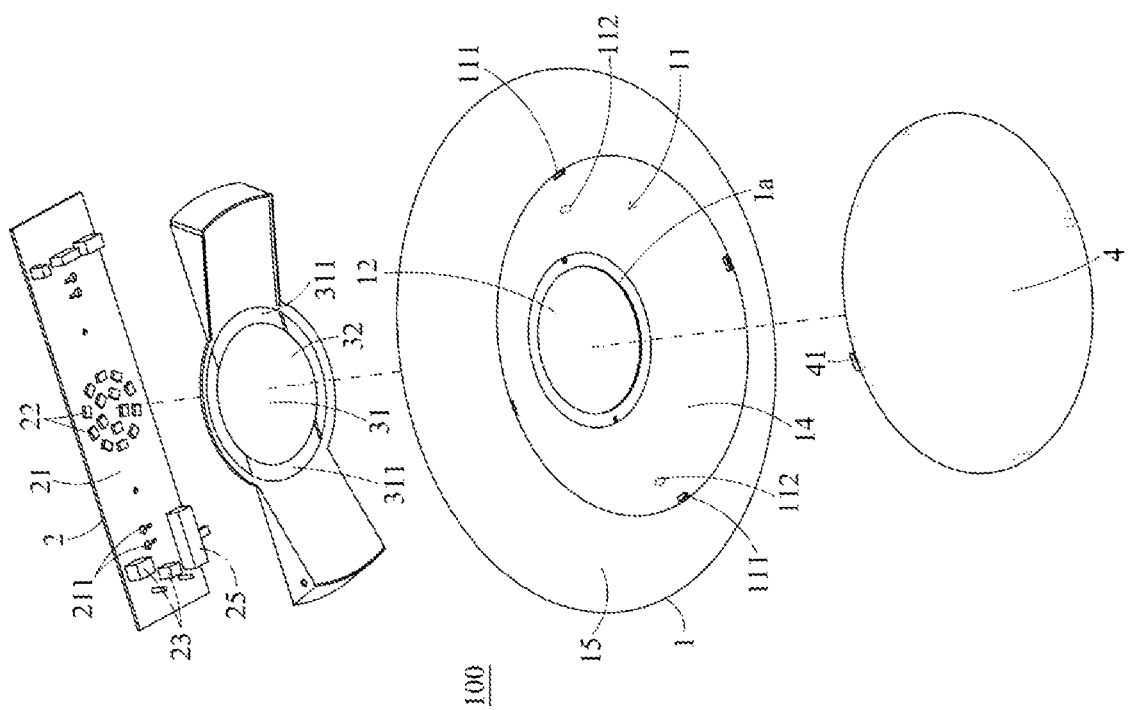
FIG. 2 is an exploded view of the ultra-thin downlight in accordance with one embodiment of the present invention.

Please refer to FIG. 1 and FIG. 2. FIG. 1 is a perspective view of an ultra-thin downlight 100 in accordance with one embodiment of the present invention. FIG. 2 is an exploded view of the ultra-thin downlight 100 in accordance with one embodiment of the present invention.

In some embodiments, the ultra-thin downlight 100 includes a heat radiator 1, a light source module 2, a protective cover 31 and a light cover 4.

Figure 6:
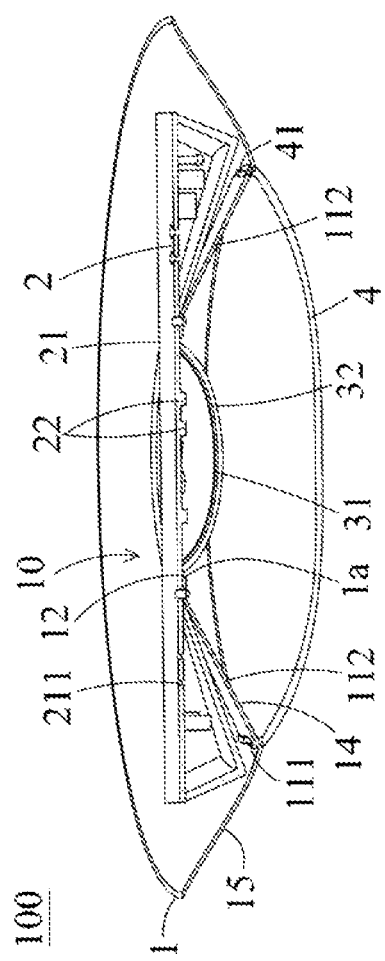
FIG. 6 is a sectional view of a cross-section A-A of FIG. 5.

In some embodiments, the heat radiator 1 is plat and circular. The back side of the heat radiator 1 is provided with an assembling portion 10 (as shown in FIG. 6) and the front side of the heat radiator 1 is provided with an installation portion 11 and a central hole 12 disposed in the installation portion 11.

In some embodiments, a light source module 2 includes a circuit board 21, a plurality of light-emitting elements 22 and a driving element 23. The circuit board 21 is fixed on the assembling portion 10. The light-emitting elements 22 and the driving element 23 are disposed on the circuit board 21, such that each of the light-emitting elements 22 protrudes from the central hole 12.

In some embodiments, the protective cover 31 is disposed on the circuit board 21 to cover the light-emitting elements 22 and the driving element 23, such that the protective cover 31 is corresponding to the central hole 12.

In some embodiments, the light cover 4 is combined with the installation portion 11 to cover the protective cover 31.

In some embodiments, the light cover 4 can be rotated to make the light cover 4 be engaged with the four through holes 111 of the heat radiator 111. The rectangular circuit board 21 has a plurality of light-emitting elements 22 and a driving element 23 disposed on the circuit board 21. The circuit board 21 is fixed on the heat radiator 1 by several screws. The protective cover 31 is disposed on the circuit board 21 so as to cover the light-emitting elements 22 and driving element 23. The light-emitting elements 22 and driving element 23 are disposed in different chambers. The light-emitting elements 22 is not covered by the driving element 23, which can increase the luminous efficiency of these light-emitting elements 22.

In some embodiments, the light source module 2 is provided with a driver on board (DOB). Thus, the downlight 100 is an ultra-thin DOB type downlight.

Figure 3:
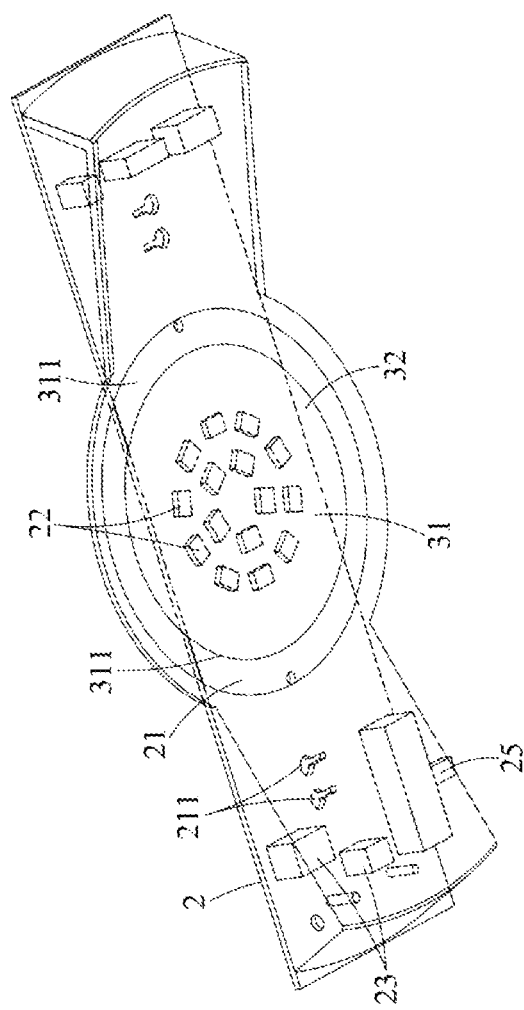
FIG. 3 is a perspective view for illustrating a light source module and a protective cover of the ultra-thin downlight in accordance with one embodiment of the present invention. The light source module, a plurality of light-emitting elements and a driving element are shown by dotted line.
Figure 4:
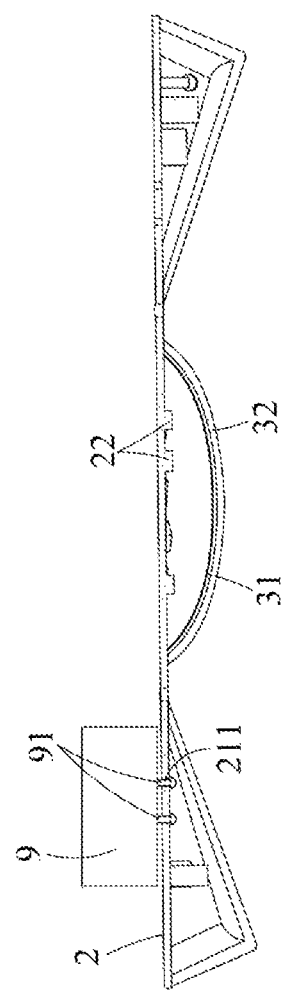
FIG. 4 is a sectional view for illustrating the light source module and protective cover of the ultra-thin downlight in accordance with one embodiment of the present invention, which includes a junction box installed on a circuit board.

Please refer to FIG. 3 and FIG. 4. FIG. 3 is a perspective view for illustrating the light source module 2 and the protective cover 31 of the ultra-thin downlight 100 in accordance with one embodiment of the present invention. The light source module 2, the light-emitting elements 22 and the driving element 23 are shown by dotted line. FIG. 4 is a sectional view for illustrating the light source module 2 and protective cover 31 of the ultra-thin downlight 100 in accordance with one embodiment of the present invention, which includes a junction box 9 installed on the circuit board 21. In some embodiments, the protective cover 31 is made of a transparent plastic material. The structure of the protective cover 31 is specially designed. The protective cover 31 is installed on the circuit board 21 via screws. The lights emitted by the light-emitting elements 22 penetrate through the protective cover 31 and enter the space outside the protective cover 31.

Please refer to FIG. 3 and FIG. 4. In some embodiments, the protective cover 31 is covered by a lens 32. The lens 32 and protective cover 31 are integrally-formed. The lens 32 is detachably disposed on the installation portion 11 to cover the central hole 12. When the user rotates the lens 32 to separate the lens 32 from the central hole 12, the protective cover 31 still covers the circuit board 21, which can effectively avoid that the user gets an electric shock caused by the light-emitting elements 22 or other electronic components. Thus, the safety of the ultra-thin downlight 100 can be further enhanced.

Figure 5:
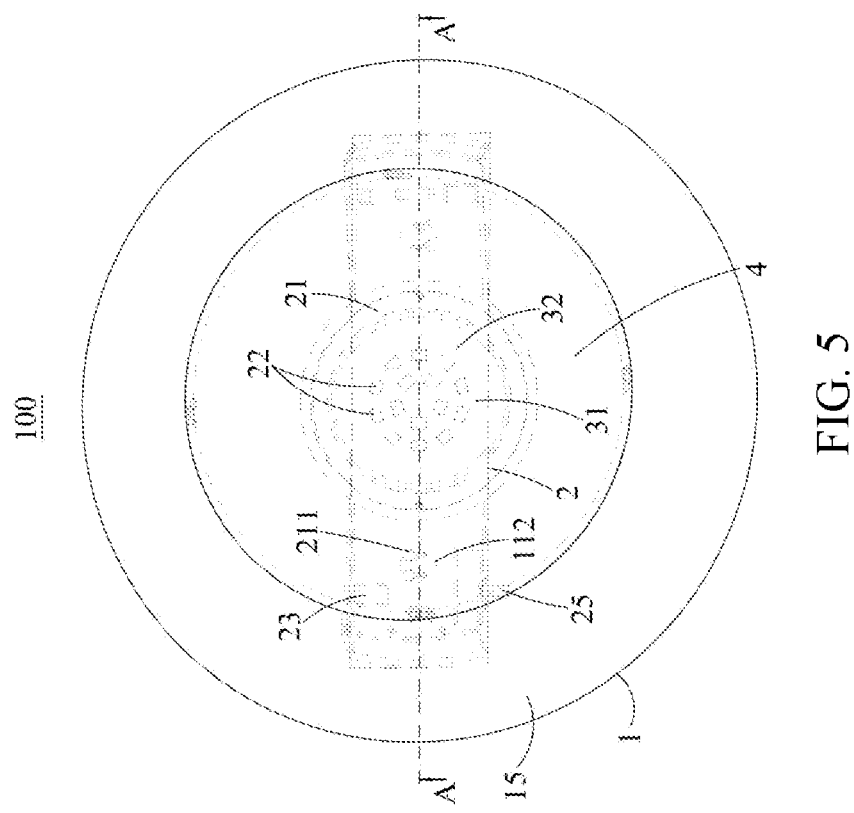
FIG. 5 is a top view of the ultra-thin downlight in accordance with one embodiment of the present invention. The light source module and protective cover are shown by dotted line.

Please refer to FIG. 2~FIG. 6. FIG. 5 is a top view of the ultra-thin downlight 100 in accordance with one embodiment of the present invention. The light source module 2 and protective cover 31 are shown by dotted line. FIG. 6 is a sectional view of a cross-section A-A of FIG. 5. In some embodiments, the heat radiator 1 is made of a metal material. The heat radiator 1 has an inner reflecting slope 14 disposed on the installation portion 11 and an outer slope 15 disposed around the inner reflecting slope 14. The heat radiator 1 is dish-shaped, such that the downlight 100 can be thin, and looks simple and elegant. The surface of the circular inner reflecting slope 14 can serve as a reflector in order to further enhance the luminous efficiency of the light-emitting elements 22.

Please refer to FIG. 2~FIG. 6. In some embodiments, the installation portion 11 is circular and cup-shaped. The inner wall of the installation portion 11 is provided with a plurality of through holes 111. The edge of the light cover 4 is provided with a plurality of hooks 41 engaged with the through holes 111 respectively.

Please refer to FIG. 2~FIG. 6. In some embodiments, the protective cover 31 is provided with a plurality of slots 311 and the edge 1a of the central hole 12 penetrates through the slots 311 to contact the circuit board 21. The gap of the protective cover 31 can achieve the thermal contact between the circuit board 21 and the heat radiator 1.

Please refer to FIG. 2~FIG. 6. In some embodiments, the circuit board 21 has a plurality of combining holes 211 (these combining holes 211 look likes two pairs of key holes), wherein several studs 91, for fixing the junction box 9, penetrate through the combining holes 211 respectively and are fixed in the combining hole 211. The heat radiator 1 has a plurality of observation holes 112 disposed on the installation portion 11 and the observation holes 112 are corresponding to the studs 91 respectively, such that the studs 91 can be observed via the observation holes 112 respectively. The user can see the studs 91 via these observation holes 112 and the transparent protective cover 31 during the installation process. In some embodiments, the ultra-thin downlight 100 can use a 5-inch or 6-inch junction box.

Please refer to FIG. 2~FIG. 6. In some embodiments, the power components and the light-emitting elements 22 are disposed at the same circuit board 21 and the circuit board 21 is provided with a switch module 25 for adjusting the color temperature and power of the light-emitting elements 22. The user can press the switch button on one side of the switch module 25 in order to adjust the color temperature or power of the light-emitting elements 22.

To sum up, according to the embodiments of the present invention, the structure of the heat radiator of the ultra-thin downlight is flat and circular. Via this structure, the downlight can operate normally without a reflector. In addition, the lens and protective cover of the downlight are integrally-formed, which can significantly reduce the material cost and manufacturing cost. Thus, the overall cost of the ultra-thin downlight can be greatly decreased.

The embodiment just exemplifies the present invention and is not intended to limit the scope of the present invention; any equivalent modification and variation according to the spirit of the present invention is to be also included within the scope of the following claims and their equivalents.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ultra-thin downlight, comprising:
a heat radiator having a back side and a front side, wherein the heat radiator is flat and circular, and the back side is provided with an assembling portion and the front side is provided with an installation portion and a central hole disposed in the installation portion, wherein the heat radiator has a plurality of observation holes disposed on the installation portion;
a light source module, comprising a circuit board, a plurality of light-emitting elements and a driving element, wherein the circuit board has a plurality of combining holes and is fixed on the assembling portion, and the light-emitting elements and the driving element are disposed on the circuit board, whereby each of the light-emitting elements protrudes from the central hole;
a protective cover disposed on the circuit board to cover the light-emitting elements and the driving element, wherein the protective cover is corresponding to the central hole; and
a light cover combined with the installation portion to cover the protective cover;
wherein a stud, for fixing a junction box, penetrates through one of the combining holes and is fixed in the combining hole, and one of the observation holes is corresponding to the stud, whereby the stud is able to be observed via the observation hole.

2. The ultra-thin downlight as claimed in claim 1, wherein the heat radiator is made of a metal material.

3. The ultra-thin downlight as claimed in claim 2, wherein the heat radiator has an inner reflecting slope disposed on the installation portion and an outer slope disposed around the inner reflecting slope, wherein the heat radiator is dish-shaped.

4. The ultra-thin downlight as claimed in claim 1, wherein the protective cover is covered by a lens, and the lens and the protective cover are integrally-formed, wherein the lens is detachably disposed on the installation portion to cover the central hole.

5. The ultra-thin downlight as claimed in claim 1, wherein the protective cover is made of a transparent plastic material.

6. The ultra-thin downlight as claimed in claim 1, wherein the installation portion is a circular and cup-shaped, an inner wall of the installation portion is provided with a plurality of through holes, and an edge of the light cover is provided with a plurality of hooks engaged with the through holes respectively.

7. The ultra-thin downlight as claimed in claim 1, wherein the protective cover is provided with a plurality of slots and an edge of the central hole penetrates through the slots to contact the circuit board.

8. The ultra-thin downlight as claimed in claim 1, wherein the circuit board has a switch module configured to adjust a color temperature or a power of the light-emitting elements.

* * * * *